(12) United States Patent
Seubert et al.

(10) Patent No.: US 8,326,017 B2
(45) Date of Patent: Dec. 4, 2012

(54) RAPID COLOR VERIFICATION SYSTEM USING DIGITAL IMAGING AND CURVE COMPARISON ALGORITHM

(75) Inventors: Christopher Michael Seubert, Livonia, MI (US); Scott Adams, Ann Arbor, MI (US); Kevin Richard John Ellwood, Ann Arbor, MI (US); Mark Edward Nichols, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 406 days.

(21) Appl. No.: 12/684,920

(22) Filed: Jan. 9, 2010

(65) Prior Publication Data

US 2011/0170763 A1    Jul. 14, 2011

(51) Int. Cl.
*G06K 9/00* (2006.01)
(52) U.S. Cl. ........................................ 382/141; 382/162
(58) Field of Classification Search .................. 382/141, 382/162–167, 209, 278, 305, 274, 276; 356/402–425; 358/401, 448, 501, 518, 504, 358/520; 355/40; 345/600, 595, 603, 593, 345/597
See application file for complete search history.

(56) References Cited

U.S. PATENT DOCUMENTS

| | | | |
|---|---|---|---|
| 6,047,085 | A | 4/2000 | Sato et al. |
| 6,177,093 | B1 | 1/2001 | Lombardi et al. |
| 6,628,829 | B1 | 9/2003 | Chasen |
| 2003/0151770 | A1 | 8/2003 | Yamazaki |
| 2007/0291120 | A1 | 12/2007 | Campbell et al. |

*Primary Examiner* — Tri T Ton
(74) *Attorney, Agent, or Firm* — Shook Hardy & Bacon LLP

(57) ABSTRACT

A system is disclosed for monitoring paint color across regions of a vehicle, for identifying color mismatches, and for dynamically determining the acceptability of an identified mismatch. The system includes a vehicle image acquisition array digital cameras for digitally scanning selected regions of the vehicle and an image analyzer connected to the vehicle image acquisition system. The image analyzer is programmed with standard confidence color curves and includes software programmed with an analysis algorithm to convert an image of a scanned region into a standard image format. Individual color curves are extracted from the standard format to compare the extracted color curves against the standard confidence color curves to determine whether or not the extracted color curves fall within standard confidence color curves. The standard confidence color curves may be adjusted during color testing based upon accumulated extracted color curves.

20 Claims, 5 Drawing Sheets

FIG-5

| Bin | Red Std. Curve | | | Green Std. Curve | | | Blue Std. Curve | | |
|---|---|---|---|---|---|---|---|---|---|
| | Lower CI | Mean | Upper CI | Lower CI | Mean | Upper CI | Lower CI | Mean | Upper CI |
| 0 | 0 | 0 | 0 | 1481467 | 1854793 | 2228120 | 121623.4 | 261250 | 400876.5991 |
| 1 | 0 | 0 | 0 | 422113.1 | 516646.2 | 611179.2 | 38793.35 | 86925 | 135056.654 |
| 2 | 0 | 0 | 0 | 4212744.4 | 502353.8 | 583433.2 | 51149.11 | 107554 | 163959.5611 |
| 3 | 0 | 0 | 0 | 398723.5 | 464451 | 530178.5 | 64617.34 | 129251 | 193885.3284 |
| 4 | 0 | 0 | 0 | 370906.4 | 421427.2 | 477947.9 | 82323.7 | 150610 | 218896.9618 |
| 5 | 0 | 0 | 0 | 341007.6 | 379995.2 | 418982.7 | 100360.1 | 170775 | 241189.2789 |
| 6 | 0 | 0 | 0 | 314629.5 | 344113.2 | 373596.8 | 119100.4 | 189727 | 260353.2969 |
| 7 | 0 | 0 | 0 | 291058.6 | 314133.5 | 337208.4 | 137465.6 | 207161 | 276856.0666 |
| 8 | 0 | 0 | 0 | 271307.1 | 290230.7 | 309154.2 | 155424.3 | 221906 | 288387.3659 |
| 9 | 0 | 0 | 0 | 255031.1 | 271233.8 | 287436.6 | 1772242.9 | 234725 | 297170.3953 |
| 10 | 0 | 0 | 0 | 239986.4 | 255534.3 | 271082.3 | 188343.3 | 245725 | 303107.0417 |

Comparison Test

| Red Test | Bins Counted? | Red check | GreenTest | Bins Counted? | Green Check | Blue Test | Bins Counted? | Blue Check |
|---|---|---|---|---|---|---|---|---|
| 0 | FALSE | 0 | 4666950.5 | TRUE | 0 | 1264458.5 | TRUE | 0 |
| 0 | FALSE | 0 | 1273966.167 | TRUE | 0 | 465943.5 | TRUE | 0 |
| 0 | FALSE | 0 | 977326.6667 | TRUE | 0 | 488470 | TRUE | 0 |
| 0 | FALSE | 0 | 712322.333 | TRUE | 0 | 484649.6667 | TRUE | 0 |
| 0 | FALSE | 0 | 517645.1667 | TRUE | 0 | 469088 | TRUE | 0 |
| 0 | FALSE | 0 | 384427.333 | TRUE | 1 | 449631 | TRUE | 0 |
| 0 | FALSE | 0 | 293386 | TRUE | 0 | 427715.667 | TRUE | 0 |
| 0 | FALSE | 0 | 231472.333 | TRUE | 0 | 405880.1667 | TRUE | 0 |
| 0 | FALSE | 0 | 188736.5 | TRUE | 0 | 384192.1667 | TRUE | 0 |
| 0 | FALSE | 0 | 158700 | TRUE | 0 | 363038.1667 | TRUE | 0 |
| 0 | FALSE | 0 | 137194 | TRUE | 0 | 342720 | TRUE | 0 |

RAPID COLOR VERIFICATION SYSTEM USING DIGITAL IMAGING AND CURVE COMPARISON ALGORITHM

TECHNICAL FIELD

The disclosed invention relates generally to a system for monitoring paint colors once the colors have been applied to a vehicle. More particularly, the disclosed invention provides a system for monitoring paint color across regions of a vehicle by identifying color mismatches and for dynamically determining the acceptability of an identified mismatch.

BACKGROUND OF THE INVENTION

In the early days of the automobile the exterior finish was relatively primitive both in method of application and formulation. When first introduced, the Ford Model T was hand painted using a rake-like device which poured on flowing paint, the excess of which was captured in a tub for re-use. The paint itself was a solvent-based varnish. While available in such colors as blue and green these colors appeared to be virtually black unless viewed in bright sunlight due to the varnish paint. This characteristic contributed to the mistaken belief that all Model T's were black.

As with all other areas of automotive technology painting techniques and paint composition have developed dramatically since those early days. Today's paints, including environmentally-friendly powder coatings which are based on acrylic binder chemistry and thus contain no solvents, are applied in far more sophisticated ways to achieve more durable and appealing results. Today's paints include aluminum flakes, micas, and other particulates to create desired pigmentation. These paints are highly durable and resist fading even when exposed to the harshest environment.

Despite significant advances in knowledge of the composition and characteristics of automotive paint, as new and more complex exterior paint colors are introduced to the automotive industry, unique challenges remain in controlling the quality and accuracy of the application of these colors. While the use of new pigments is one method of creating new colors, another is through the creation of multiple color layers in the paint system, giving rise to a unique appearance. These color systems include, but are not limited to two-tones, tricoats, and tinted clearcoat systems. With these new technologies come unique challenges in controlling the quality of the paint colors, insuring that not only are the correct color layers applied, but that they are applied correctly over the entire vehicle.

In some cases, an error in the color application is not obvious to the casual observer, and the defective vehicle will make it through final assembly before the defect is identified. To correct the error, a paint repair is done to the unit in order to make it acceptable for delivery. This repair is costly in terms of time, labor and material.

Accordingly, a simple, automated system is needed to monitor the paint color across critical color regions on the vehicle and to identify when gross color mismatches occur while allowing for the acceptable part-to-part color shifts that occur in production throughout the day.

SUMMARY OF THE INVENTION

The disclosed invention provides a system for monitoring paint color across regions of a vehicle that is cost-effective and efficient. The disclosed system provides a system that is capable of identifying color mismatches and for dynamically determining the acceptability of an identified mismatch. The disclosed system includes a vehicle image acquisition array for digitally scanning selected regions of the vehicle and an image analyzer connected to the vehicle image acquisition system. The vehicle image acquisition array includes one or more digital cameras either positioned on one or more robots or on a stationary halo. The image analyzer is initially programmed with upper and lower standard confidence color curves such as RGB, L*ab, and XYZ.

The image analyzer includes software programmed with an analysis algorithm to convert an image of one of the scanned regions acquired by the vehicle image acquisition array into a standard image format from which actual individual color curves are extracted. The extracted color curves are compared against the standard confidence color curves to determine whether or not the extracted color curves fall within the upper and lower standard confidence color curves by establishing a percentage match for one of the scanned regions. The initially programmed upper and lower standard confidence color curves may be adjusted during color testing based upon accumulated extracted color curves of the selected regions.

The image acquisition and analysis process of the disclosed invention allows for the rapid examination of critical color regions on a vehicle to identify defects in color application. The analysis algorithm used to determine the overlap region can be used to identify differences not only in the color curves, but also other identifier curves, such as a reflection spectrum, or even an absorbance spectrum. This technique of the disclosed invention has the potential for use in multiple industries beyond the automotive industry and in fact can find application in any industry that requires color matching, such as the automotive refinish industry, the textile industry, or the printing industry.

Implementation of the color verification system of the disclosed invention would allow for the automated checking of critical color points on every vehicle that exits the paint shop. Upon identifying the target color of the vehicle being processed (via vehicle tracking), the standard confidence intervals for the assigned color would be read into the system. The image acquisition sequence would then begin in which the critical color points on the test vehicle would be imaged. From the images, the color curves would be calculated for each color point. These test points are then be compared to the standard confidence intervals, calculating the percentage match for each point measured on the vehicle. If the percent match fails to meet minimum levels for any color point, the vehicle is flagged for a visual inspection. Advantageously, the entire process would take no longer then a few seconds. Use of the process would improve quality, reduce costs, and require limited capital investment.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 5 is a tabulate analysis of the color curve set of FIG. 3.

DETAILED DESCRIPTION OF THE PREFERRED EMBODIMENT

Figure 1:
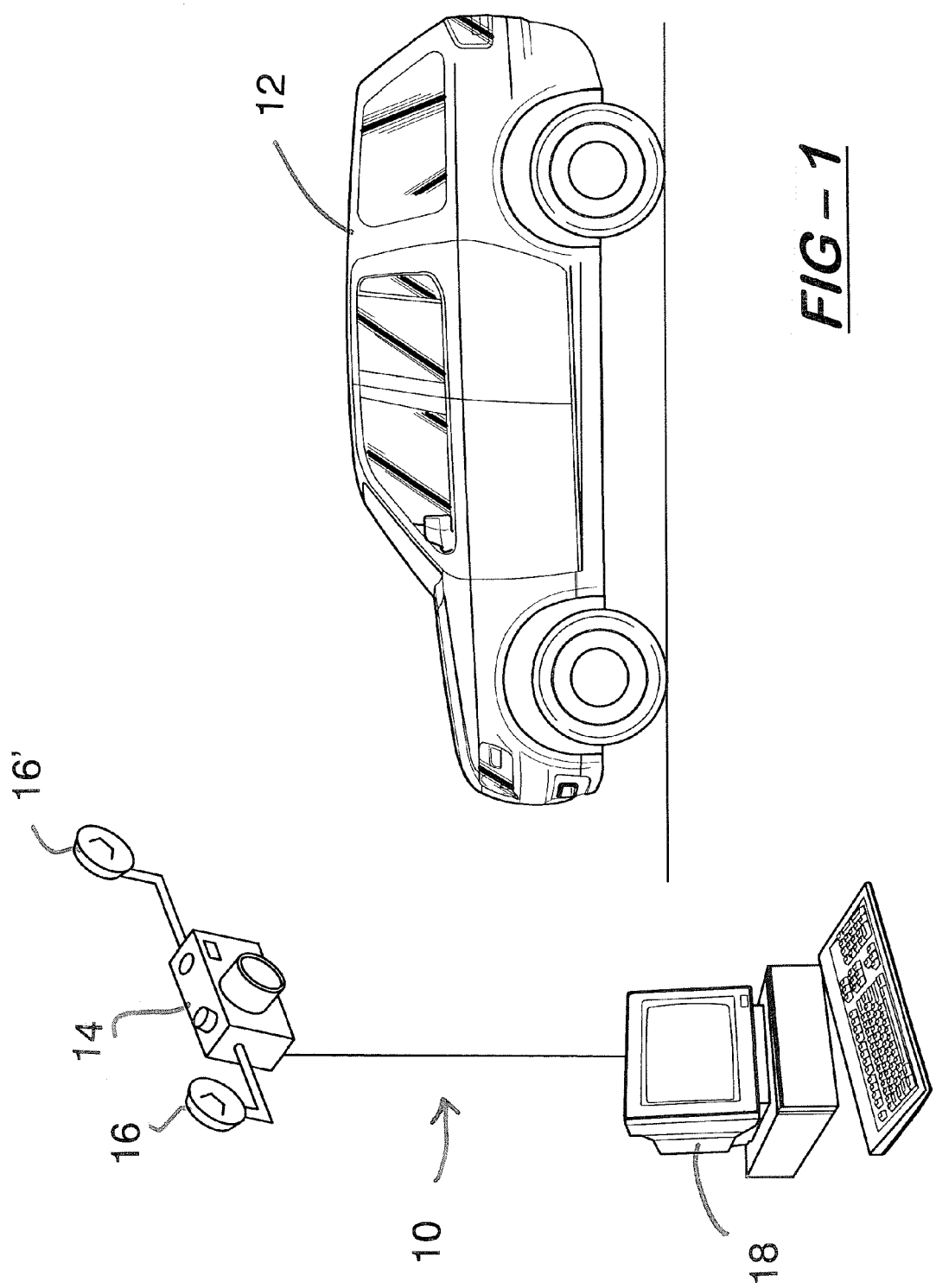
FIG. 1 is a diagrammatic view of the rapid color verification system of the disclosed invention in which the vehicle image acquisition array and the image analyzer are shown relative to a subject vehicle.

In the following figures, the same reference numerals will be used to refer to the same components. In the following description, various operating parameters and components are described for different constructed embodiments. These specific parameters and components are included as examples and are not meant to be limiting.

Referring to FIG. 1, a diagrammatic view of the rapid color verification system of the disclosed invention, generally illustrated as 10, is shown relative to a subject vehicle 12. It should be understood that the system 10 as shown is set forth for illustrative purposes only and is not intended as being limiting. For example, rather than the illustrated vehicle 12 other types of vehicles may be monitored by the system 10. In addition, the disclosed invention is not limited to monitoring of colors on vehicles, but may also be used for monitoring the paint colors on any one of a variety of articles, including for example refrigerators, aircraft and furniture. The system 10 of the disclosed invention may thus find any use where a paint coat is used.

The system 10 includes a vehicle image acquisition array comprising a digital camera 14. While only a single camera 14 is shown it is to be understood that a greater number of digital cameras may be used. Preferably the camera 14 is of the single lens reflex variety and is equipped with a macro lens such as a 90 mm macro lens. This arrangement is not mandatory as any camera and lens combination having the ability to focus at close distances (for example, ~28 cm to the sensor) and sufficient resolution would suffice.

The camera 14 needs to be able to image a certain area, for example, an area of ~5 cm×~3.5 cm may be imaged, although a larger or small range may be imaged. First, the camera 14 takes an image of the area in RAW format. The shutter speed and aperture of the camera 14 are held constant across all sample and control images for a specific color. Preferably the camera 14 is set on the smallest aperture possible (that is, the largest f-stop) for the associated lens to maximize the depth of field of the area being imaged. Lighting can be provided by any light source that supplies an even illumination across the imaged region such as the dual strobe lights 16 and 16'. It is to be understood that while the dual strobe lights 16 and 16' are shown. Alternatively, any strobe flash, such as a ring or a macro flash, can be used as can an on-camera flip-up flash. Regardless of the form of lighting, the lighting arrangement must be able to have its intensity adjusted based on the target color to eliminate overexposure. The imaged region must also be free of any glare and reflections from the surrounding lights and area, as this will cause errors in the measured color curves. As is understood by those skilled in the art, higher intensity lights or flashes can reduce reflections better than diffuse light sources.

The system 10 further includes an image analyzer 18 connected with the vehicle image acquisition array 14. The image analyzer 18 includes a program having an algorithm that can rapidly examine a painted area and relatively compare its color curves to a set of preprogrammed, previously calculated confidence intervals to establish percentage match for the particular area of the vehicle being imaged. Typically the color curves would be RGB curves, but it should be noted that the technique of the disclosed invention is not limited to RGB curves, and can be used with other color space systems such as L*ab and XYZ curves and the like.

Figure 2:
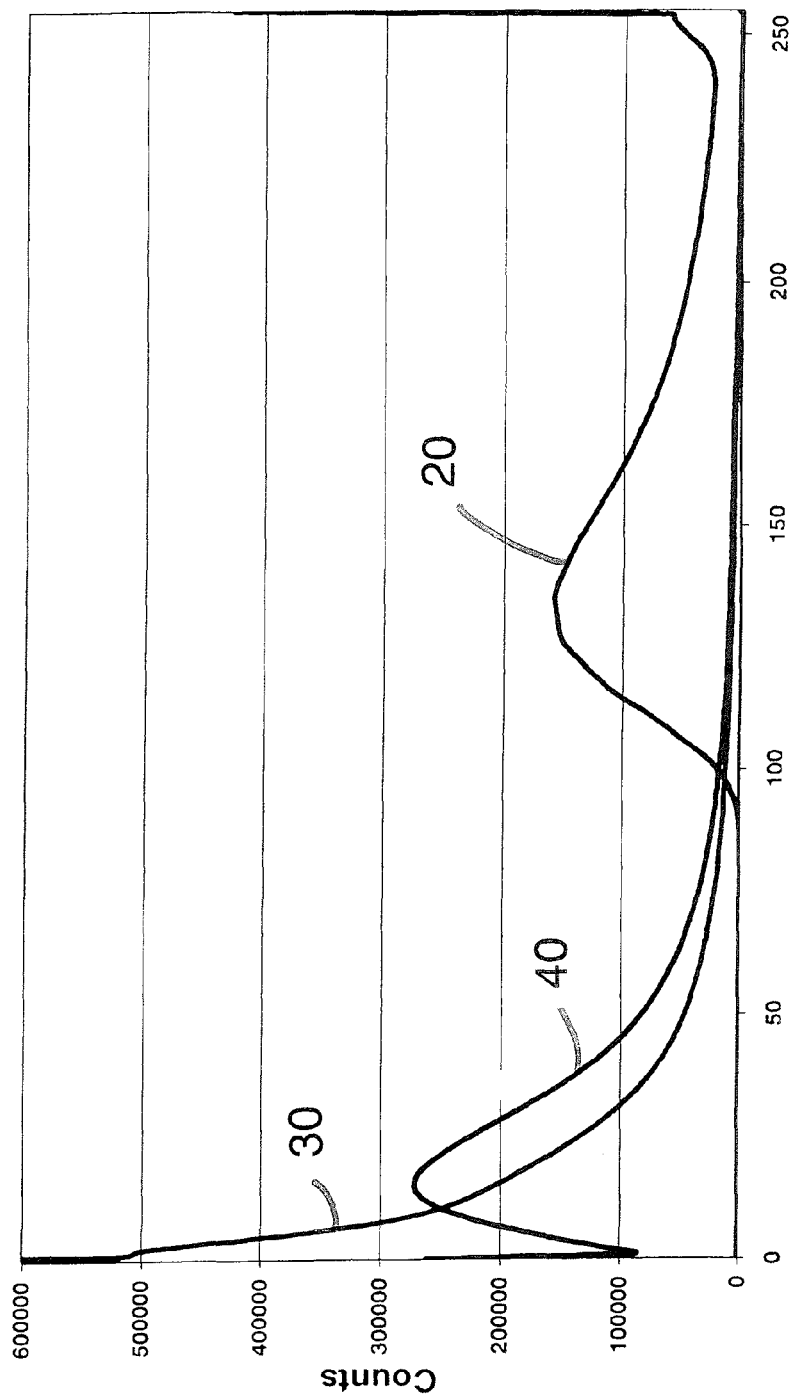
FIG. 2 is an exemplary graph illustrating a color curve extracted from a digital color image.

The image acquired by the system 10 is a RAW image. This image is then processed (for example, by Photoshop®) and is set to a previously determined standard color temperature and tint level. The processed images are then converted into a standard image format. Such standard image formats include, without limitation, JPG, TIFF and GIF. The individual color curves are them extracted and saved for each associated image as set forth in the exemplary graph illustrated in FIG. 2 in which RGB color curves are illustrated with red color being curve 20, green color being curve 30, and blue color being curve 40.

Each pixel has an associated color value and each color image has a number of bins associated with it. The number of bins depends on the bits per color image. As a preferred but non-limiting example, an 8-bit color image may have associated with it up to 256 bins ($2^8=256$), or between 0-255 bins. However, higher bit color images may be used, such as 10-bit, 12-bit, 14-bit or higher. The increased number of bits simply provides more bins to analyze. Again using RGB as an example, the color value of RGB with 8 bits per color image is between 0-255 bins. Continuing with this example, the RGB curves represent the number (count) of pixels with an RGB value of an exemplary 8-bit color image within each bin between 0-255

The method/algorithm used to compare test images to color "standard" images (as indicated by the user or by computerized identification) starts with the creation of a color fingerprint for each "standard" color's individual curve. This is done by examining a plurality of color images (preferably at least six color images) that are considered to be color accurate. The color curves from these samples are used to calculate the confidence interval range for the samples. The confidence interval range is characterized as a percentage which represents the alpha range used to calculate the confidence/prediction interval. This figure represents the percentage of correct values desired to be selected at a later time. Particularly, the closer the confidence percentage gets to 100 the wider the confidence internal needs to be in order to assure securing a higher percentage of correct values. Any alpha range may be selected. According to a preferred embodiment of the disclosed invention, the alpha range is between about 90.0% and 99.9%. Again using RGB color curves as an example, an acceptable count range for each individual RGB value is set at between 0-255 as illustrated in FIG. 3.

Figure 3:
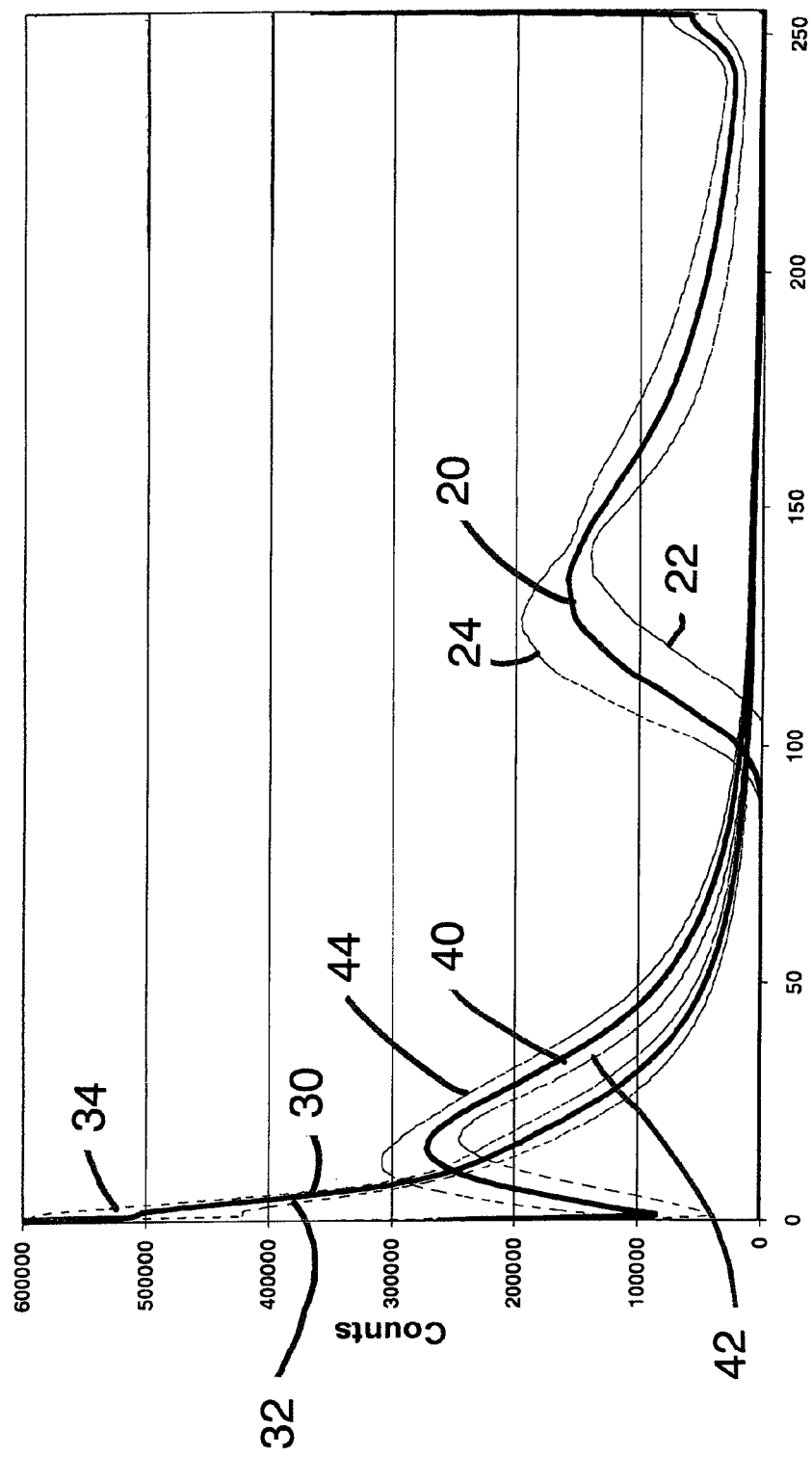
FIG. 3 is an exemplary graph illustrating a color curve with a high confidence interval around each of the three illustrated curves.

With reference to FIG. 3, the red color curve 20, the green color curve 30, and the blue color curve 40 are again illustrated. In addition to the curves 20, 30 and 40, the upper and lower limits of each curve are also illustrated. Specifically, the lower limit of the red curve 20 is shown as lower limit curve 22 while the upper limit of the red curve 20 is shown as upper limit curve 24. Similarly, the lower limit of the green curve 30 is shown as lower limit curve 32 while the upper limit of the green curve 30 is shown as upper limit curve 34. Finally, the lower limit of the blue curve 40 is shown as lower limit curve 42 while the upper limit of the blue curve 40 is shown as upper limit curve 44. It should be understood that the curves shown in FIG. 3 are set forth for illustrative purposes only and are not intended as being limiting as other color curves are possible.

An important aspect of the disclosed invention is the way in which the system interacts with the vehicle production system. By being able to read the color of the vehicle by way of the electronic tag conventionally attached to the vehicle, the system enables identification of the appropriate color standard with confidence intervals, a relative comparison between the test color and the standard color, and then determines if the applied color is a PASS or a FAIL. If the color is a PASS, then the tested vehicle is allowed to move on. If on the other hand the color is a FAIL, then a notification (in the form of, for example, an alarm or other warning) is communicated with the system operator that the particular vehicle requires further inspection.

When checking a test image to see if the color curves fall within the standard confidence intervals, each bin value is checked against the established confidence intervals. If the test count falls within the standard count confidence interval, then that determination is considered as a PASS for that bin. On the other hand, if the count falls outside of the standard count confidence interval range, then that is considered as a FAIL for that bin. According to the preferred embodiment of the present invention, regions are not tested that are below a set minimum count level in both the test curve and the standard curve because these are regions that do not impact the paint color.

Figure 4:
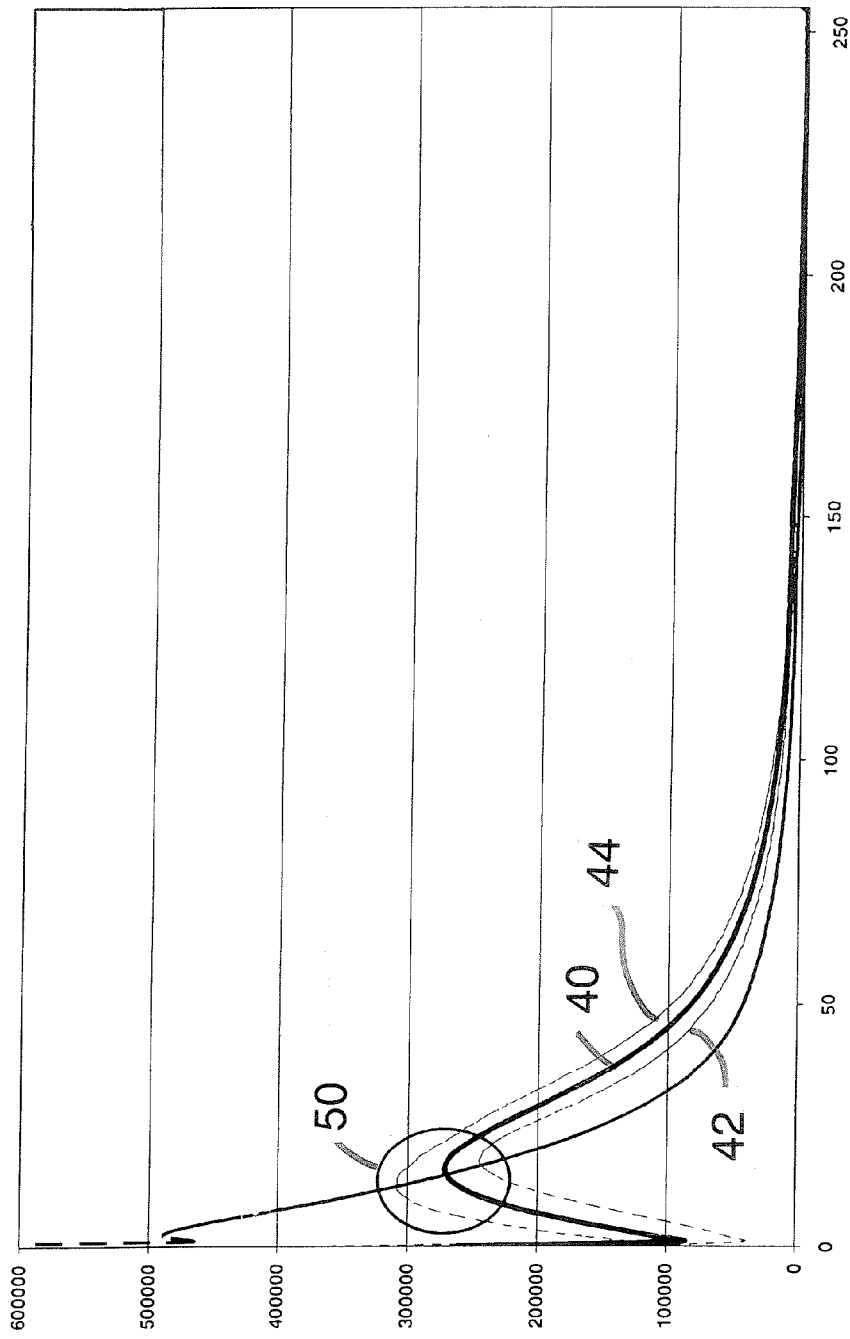
FIG. 4 is an exemplary graph illustrating sample blue standard curves plotted against a blue test panel curve.

Once the PASS bin and FAIL bin determinations are made, the number of PASS bins are then added up and divided by the number of checked bins to provide a percentage match for that individual test curve. As there are three curves (generally, but not exclusively, R, G, and B), the end result of the panel analysis is an R % match, a G % match, and a B % match for a particular test sample. A visual representation of the overlap region is shown as overlap region 50 in FIG. 4. A portion of the tabulated analysis of an RGB curve set is shown in FIG. 5. The threshold for the PASS/FAIL of a particular test sample is set by the user.

As an optional variation of the disclosed invention, in order to allow for acceptable part-to-part color variations, the disclosed invention utilizes a novel method of recalculating the confidence intervals using the most recent "passing" test panels of each individual color. According to this option, the color data could be used to recalculate the confidence intervals in order to provide a living color fingerprint for each color. Specifically, when a new test panel is identified as "passing," it replaces the oldest test panel used in the previous calculation of the confidence intervals, after which a new confidence interval is calculated and used for the next test. This allows for the confidence intervals to be dynamic and to drift due to part-to-part variations while still allowing the algorithm to identify relative gross color mismatches. The number of test samples used for the confidence interval calculation is set by the user, but, as previously stated, should be at least six samples and may be greater than six samples. However, this variation may not be universally desirable and the disclosed system may be operated without the provision of the living color fingerprint.

The foregoing discussion discloses and describes exemplary embodiments of the present invention. Variations of the disclosed invention may be made without deviating from the spirit and scope of the disclosed invention. For example, in addition to the disclosed method of comparing curves, reference may instead be made to a selected metric centered around the shape of the curves. It is also possible to compare curves by averaging the error between the curve determined to be correct and a test curve. Accordingly, one skilled in the art will readily recognize from the foregoing discussion, the accompanying drawings and claims that additional modifications and variations can be made therein without departing from the true spirit and fair scope of the invention as defined by the following claims.

What is claimed is:

1. A system for monitoring paint color across regions of a vehicle, for identifying color mismatches, and for dynamically determining the acceptability of an identified mismatch, the system comprising:
    a vehicle image acquisition array for digitally scanning selected regions of the vehicle;
    an image analyzer connected with said vehicle image acquisition array, said image analyzer being initially programmed with upper and lower standard confidence color curves, said image analyzer including software to:
        convert an image of one of said scanned regions acquired by said vehicle image acquisition array into a standard image format from which actual individual color curves are extracted; and
        compare said extracted color curves against said standard confidence color curves to determine whether or not said extracted color curves fall within said upper and lower standard confidence color curves by establishing a percentage match for said one of said scanned regions,
    wherein said initially programmed upper and lower standard confidence color curves may be adjusted during color testing based upon accumulated extracted color curves of said selected regions.

2. The system for monitoring paint color of claim 1 wherein said color curves are selected from the group consisting of RGB, L*ab, and XYZ.

3. The system for monitoring paint color of claim 1 wherein said vehicle image acquisition array includes a digital camera.

4. The system for monitoring paint color of claim 1 wherein said image analyzer includes a processor for processing the acquired image according to standard color temperature and tint level.

5. The system for monitoring paint color of claim 1 wherein said extracted color curves for each scanned region define a bin.

6. The system for monitoring paint color of claim 5 wherein the number of bins is based on the bit count of said image.

7. The system for monitoring paint color of claim 1 wherein said upper and lower standard color curves are based upon a plurality of color accurate images.

8. The system for monitoring paint color of claim 7 wherein said plurality of color images is six.

9. The system for monitoring paint color of claim 8 wherein said plurality of color images is more than six.

10. A system for monitoring paint color across regions of a vehicle, for identifying color mismatches, and for dynamically determining the acceptability of an identified mismatch, the system comprising:
    a vehicle image acquisition array for digitally scanning two or more regions of the vehicle;
    an image analyzer connected with said vehicle image acquisition array, said image analyzer being initially programmed with upper and lower standard confidence RGB curves based upon a plurality of color accurate images taken of color accurate samples, said image analyzer including software to:
        convert an image of one of said scanned regions acquired by said vehicle image acquisition array into a standard image format from which actual individual RGB curves are extracted;
        compare said extracted RGB curves against said standard confidence RGB curves to determine whether or not said extracted RGB curves fall within said upper and lower standard confidence RGB curves by establishing a percentage match for said one of said scanned regions; and adjust said initially programmed upper and lower standard confidence RGB curves during color testing.

11. A method for monitoring paint color across regions of a vehicle, for identifying color mismatches, and for dynamically determining the acceptability of an identified mismatch, the system comprising:

forming a vehicle image acquisition array for digitally scanning two or more regions of the vehicle;

forming an image analyzer;

connecting said image analyzer with said vehicle image acquisition array;

determining upper and lower standard confidence color curves;

capturing at least two images of selected regions of the vehicle with said vehicle image acquisition array;

converting the captured images into a standard image format;

extracting color curves from said captured images;

creating an extracted color curve bin for inclusion of said extracted color curves for each captured image;

comparing the extracted color curves of each extracted color curve bin against said standard confidence color curves;

determining whether or not said extracted color curves of each extracted color curve bin fall within said upper and lower standard confidence curves; and assigning either a PASS or a FAIL to each of said bins.

12. The method of claim 11 including the step of adding the number of PASS bins and dividing the number by all of the bins analyzed to create a percentage match for a particular color curve.

13. The method of claim 12 wherein each color curve of each bin is assigned a percentage match.

14. The method of claim 11 including the step of dynamically recalculating one or both of said upper and lower standard confidence color curves based upon extracted color curves of a region assigned a PASS.

15. The method of claim 11 wherein said step of determining upper and lower standard confidence curves is based upon image acquisition of color accurate samples.

16. The method of claim 15 wherein six color accurate samples are used.

17. The method of claim 16 wherein more than six color accurate samples are used.

18. The method of claim 15 wherein a confidence range for said samples is in the range of between about 90.0% and 99.9%.

19. The method of claim 11 wherein said standard confidence color curves and said extracted color curves are curves selected from the group consisting of RGB, L*ab, and XYZ.

20. The method of claim 11 wherein the number of bins is based on the bit count of said image.

* * * * *